United States Patent
Mertens

[15] 3,692,356
[45] Sept. 19, 1972

[54] HEAD REST WITH ADJUSTING DEVICES

[72] Inventor: Wolfgang Mertens, Karlsruhe, Germany

[73] Assignee: Firma Kurt Herzer, Karlsruhe, Germany

[22] Filed: Feb. 24, 1970

[21] Appl. No.: 13,575

[30] Foreign Application Priority Data

Sept. 2, 1969   Germany..........P 19 44 414.5

[52] U.S. Cl..................................297/408, 297/410
[51] Int. Cl..................................A47c 7/38
[58] Field of Search............297/407, 408, 410, 397; 287/14; 306/45; 74/521

[56] References Cited

UNITED STATES PATENTS

| | | |
|---|---|---|
| 2,831,530 | 4/1958 | Chiopelas et al..........297/397 |
| 3,547,486 | 12/1970 | Herzer et al..............297/397 |
| 555,860 | 3/1896 | Hanger.....................297/410 |
| 602,625 | 4/1898 | La Fave....................287/14 |
| 1,181,137 | 5/1916 | Heggland..................287/14 |
| 2,796,619 | 6/1957 | Hammer....................287/14 |
| 3,091,841 | 6/1963 | Wurzel......................74/521 |
| 3,477,761 | 11/1969 | Krantz.....................297/410 |

Primary Examiner—Francis K. Zugel
Assistant Examiner—Darrell Marquette
Attorney—Edwin E. Greigg

[57] ABSTRACT

The invention relates to tiltable head rests for attachment to the back rest of an automobile and includes a vertically adjustable head rest supported on a housing which includes a telescopic brace adapted to be moved relative thereto and associated at the opposite free end with locking members permitting the tilting operation.

6 Claims, 11 Drawing Figures

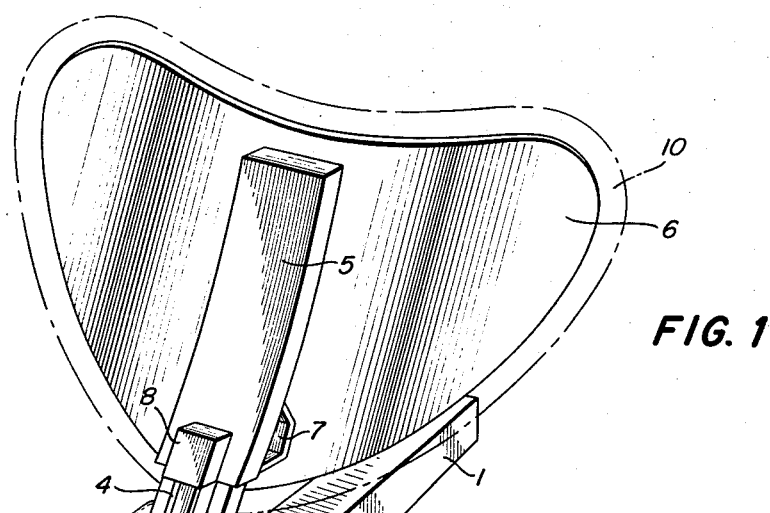
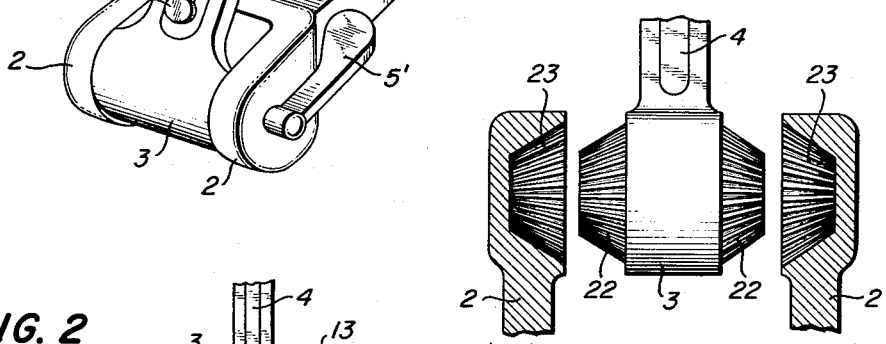
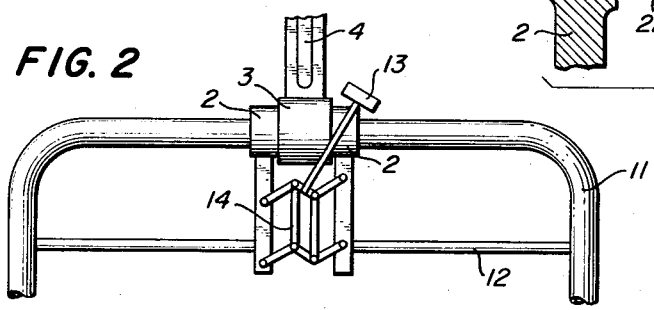
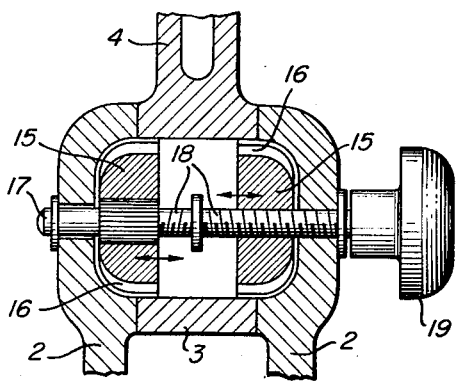
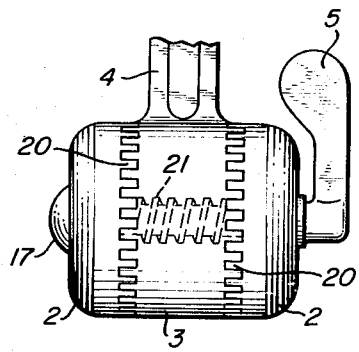
FIG. 1
FIG. 2
FIG. 3
FIG. 4
FIG. 5

PATENTED SEP 19 1972 3,692,356

HEAD REST WITH ADJUSTING DEVICES

BACKGROUND OF THE INVENTION

For the most part, existing structures of head rests for vehicle seats employ semi-finished steel and sheet metal parts, which material must be bent, punched and shaped during a large number of separate working operations. A considerable amount of work is subsequently expended also for the jointing, connecting and assembling operations. However, such an excessive amount of labor renders mass production of such items difficult as would be desirable for a general introduction of head rests for reasons of safety.

OBJECTS AND SUMMARY OF THE INVENTION

Accordingly, the principal object of the invention is to provide a head rest arrangement comprising a small number of parts that can be manufactured in a simple manner in large quantities by means of modern shaping methods, such as for example, casting or molding, die casting and injection molding, drawing, etc., and thus provide a product having maximum stability together with optimum adjustability.

The following arrangement is proposed for solution of the problems known in the prior art.

The adjusting frame of the head rest, which supports the cushion, includes a tiltable, form-locking, clamping device which is mounted on elements forming a part of the seat back rest. The lower extremity of a member which is formed integrally with an adjustable brace and forms one part of the mechanism arranged for vertical adjustment of the head rest is positioned in a clamping device and thus adapted to be secured against turning. This vertical adjusting brace or support member slides in a telescopable housing and forms part of the force-absorbing supporting structure at the upper part of the head rest. The housing also contains a form-locking catch element for the secure force-absorbing fixation of the vertical adjustment means and may also include a clamping element associated therewith. The supporting structure at the upper part of the rest is enclosed in a hollow module which is provided with dimensions suitable for optimal absorption of energy. The surface of the module supports the cushion and the cover thereof and may be rendered mutually integral in the manufacture thereof from integral foam.

The clamping assembly which is adapted for tilting adjustment is provided with two outer clamping elements that hold an inner element secure against turning through the form-locking connection. This can be obtained through radial or axial surface profiles (e.g. teeth) of any suitable shape. Profiled connecting elements may also be set so as to produce a connection between the profiles of the outer clamping elements and the inner element to be locked. The outer clamping elements can be arranged, for example, individually on the seat back with the possibility of displacement relative thereto or combined therewith in a holder mechanism. For example, when the holder mechanism is to be arranged on the rear seat back rest, it is inserted into a sleeve which is arranged behind the seat back or disposed horizontally on the rear thereof on the hat support shelf.

The clamping elements can be tightened, e.g., by means of clamping screws or levers, as well as by expansion through the inherent elasticity of a clamping lever, or by means of a lazy-tong lever arrangement, or even by means of other well-known clamping devices.

The element or part to be clamped is preferably integral with the vertical adjustment brace. The brace is relatively wide and sturdy and provided with a suitable profile so as to possess a high moment of resistance for absorption of the large deceleration forces which are brought about in the event of accidents. The brace is provided with a counter profile for the form-locking clamping element, an abutment nose to prevent withdrawal of the brace from the housing and a flexible lug for equalization of play between the brace and the housing.

The sides of the housing structure, which are guided by the brace for vertical adjustment, support a shaped surface suitably provided with ribs for the purpose of contemplated force absorption and, in turn, include a support for the energy-absorbing body. The devices for locking and clamping operations for vertical adjustment of the head rest are arranged at the lower end of the housing. These devices comprise a suitably profiled clamping element or body which is either fixed or disconnectable by means of a spring force, wedge surfaces or eccentrics and, possibly, also a clamping device, such as for example, a cam element, wedge or a flexible pressure plate.

A hollow or ribbed body adapted to support the head and neck is slid over the force-absorbing elements. The element is provided with the properties of optimal absorption of energy. In this connection, the consideration of the dampening properties must involve the fact that impact may occur from any side and that among the forces to be anticipated are the deceleration forces which are predominant on the frontal side of the element, impact forces with a short distance of impact on the sides of the element, and impact forces with a long distance of impact on the rear side thereof.

The rear side of the upper part of the module may be provided with a fixed or articulated downward extension which covers the adjusting brace and disperses the impact which could possibly occur in that area.

The cushion which encloses the module should be very soft and of relatively low thickness so as to keep the impact acceleration at as low value as possible. It can be provided with a cover or, on the other hand, have one that is made integral therewith through the employment of integral foam.

Further objects and advantages will become more apparent from a study of the following specification taken in conjunction with the drawing.

BRIEF DESCRIPTION OF THE DRAWING

FIG. 1 is a perspective view of the improved tiltable head rest;

FIG. 2 is a fragmentary view of one type of operating means for the tiltable head rest;

FIG. 3 is a fragmentary cross-sectional view of a further operating means for the tiltable head rest;

FIG. 4 is an elevational view of another operating means for the tiltable head rest;

FIG. 5 is a cross-sectional view of still another embodiment of the operating means for the tiltable head rest;

DESCRIPTION OF THE EMBODIMENTS

Figure 6:
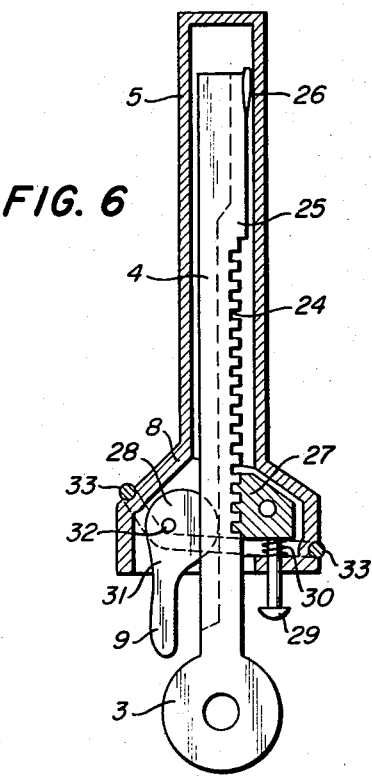
FIG. 6 is a partial elevational and partial cross-sectional view of the adjustment elements comprising the operative elements of the head rest.

Turning now to the drawings, FIG. 1 shows a perspective view of the head rest, the support 1 of which is secured in a manner now shown in the area of either the front or rear seat back rest. The frontal end of the support is divided into bifurcated clamping elements 2—2 which are adapted to withstand being spread apart and are arranged to enclose an inner clamped element 3 which is connected integrally to a brace 4 adapted to permit vertical adjustment of the head rest. Clamping elements 2—2 are firmly locked together by means of a clamping lever 5'. An adjustable housing 5, connected to a head-conforming, force-absorption surface 6, is arranged to slide on brace 4 for vertical adjustment of the head rest. At the lower end of the housing 5 a locking element is arranged as at 7 and also includes a clamping element with its operating lever 9 in the lower portion of housing 5 as at 8. For the purpose of clarity, the shape of the body 6, together with the cushion and cover 10, is merely suggested as a possible configuration.

FIG. 2 illustrates in a fragmentary manner a tubular frame 11 forming a part of a seat back rest which is also provided with a transverse brace 12 and arranged to support a head rest, not shown. In this form of the invention the outer clamping jaws 2—2 enclose an inner lock element 3 to hold rigidly and, as explained hereinbefore, the brace 4 and body 3 are integral and provide for tilting and vertical adjustment of the head rest. As is now apparent, these elements are all supported against turning on the tubular frame 11 together with its transverse brace 12 and are arranged to be brought into and out of locking engagement by a lazy-tong system of levers 14 which are actuated through a lever 13.

FIG. 3 shows, by way of another example, one of the possibilities of a form-locking arrangement which also permits tilting. Outer clamping jaws 2—2 and the inner lock element 3 are formed complementally. Through rotation of the adjustment knob 19 and by means of oppositely directed threads 18 provided on a shaft 17, locking members 15—15 with counter-gearing corresponding to parts 2—2 and 3 are first shifted toward one another to thereby release the outer clamping jaws 2—2 for tilting adjustment. On the other hand, when the locking members are shifted outward, through a rotation of the knob 19 in the opposite direction, the engagement of teeth 16 with complemental locking jaws 2—2 and lock element 3 produces a form-locking connection of the parts thereby secured against turning.

FIG. 4 shows still another form of a clamping device 3 which includes the brace 4 with oppositely extending radially disposed teeth 20. Outer clamping jaws 2—2 are released by means of a compression spring 21 positioned axially within the bore of lock 3 and may be tightened each relative to the other by means of a clamping lever 15 provided on shaft 17.

FIG. 5 discloses one possible structural configuration of the lock means showing a conical outwardly extending gearing tooth set 22—22 arranged to engage complementally formed tapered inner gears 23—23. Although this view shows no mechanism for operation of the elements 2—2 to grasp and release member 3, it is believed the system will be apparent from this disclosure.

FIG. 6 shows one embodiment of a telescopic vertically arranged adjustment device. An interiorly disposed adjusting brace 4 provided with the clamping element 3 includes a series of teeth 24, a stop 25 and a flexible lug 26. The housing 5 within which the brace 4 is slidably disposed has a lower enlarged portion within which is positioned a catch member 27 provided with teeth having the same profile as those at 24. The catch member 27 can be disengaged by means of an eccentric or cam means 28 or by means of a grip 29 when moved in a direction against the pressure of spring 30. When catch member 27 is fixed, the lever 9 having cam surface 31 is moved as desired in the enlarged portion of the housing for the purpose of tightening or loosening the locking mechanism. A shaft 32 extending transversely of the handle 9 and the eccentric is held by a clamping ring 33 and is employed simultaneously for absorption of force in the lower portion of the housing 5 and also secures the catch member 27 which is inserted through a lateral opening into the housing 5.

Figure 7:
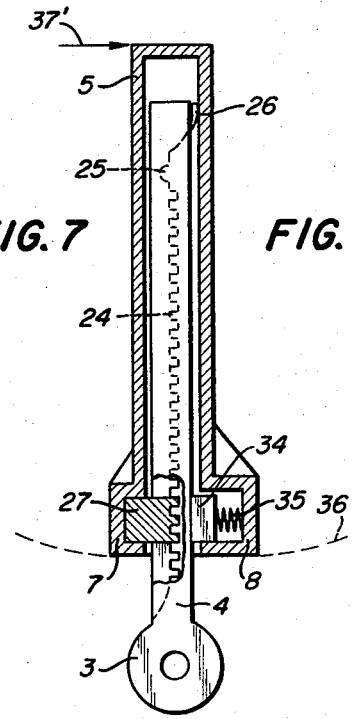
FIG. 7 is a further embodiment of a generally similar construction with the holding teeth applied to the opposite face of the brace.

FIG. 7 shows another embodiment of the structure disclosed in FIG. 6, but in this instance the teeth 24 on brace 4 extend into the opposite direction and a fixed catch member 27 having complemental teeth cooperates therewith, there also being in this concept a spring-loaded clamping element 34. By exerting pressure on the rest as indicated by the arrow 37' (the bottom of which head rest is depicted in dotted lines at 36) and against the pressure of spring 35, the catch member 27 is released from the teeth 24 to permit vertical adjustment of the head rest. After the upper part of the head rest is released, catch member 27 is automatically locked at the new level of adjustment.

Figure 8:
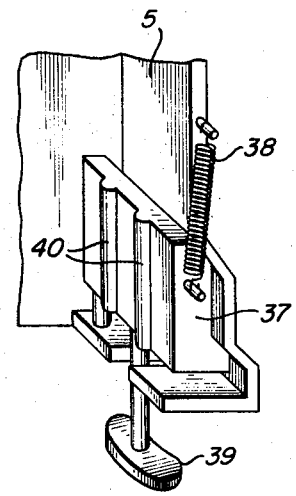
FIG. 8 is a fragmentary perspective view of a spring operated clamping element.
Figure 9:
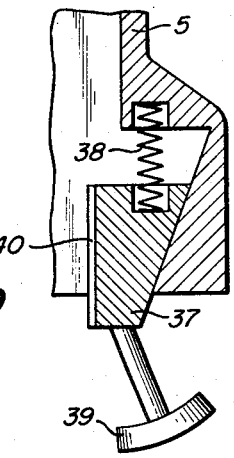
FIG. 9 is a fragmentary cross-sectional view of another spring operated clamping element.

FIGS. 8 and 9 show two possibilities of wedge-type clamping elements at 37. Numeral 38 in each instance indicates a spring means for cooperation with the wedge. In FIG. 8 the spring is arranged to pull the wedge 37 upwardly and in FIG. 9 the spring urges the wedge downwardly. Clamping member 37 is moved against the pressure of spring 38 by means of a grip 39 for the purpose of adjustment of the head rest. The ridges 40 ease the sliding movement and reduce friction during the adjustment.

Figure 10:
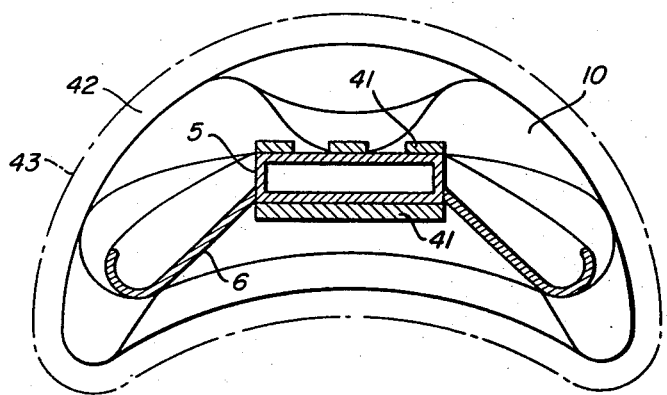
FIG. 10 is a top plan view of the head rest showing a part of the supporting elements in cross section and the head rest configuration in dotted outline.

FIG. 10 is a view from above the rest on a central cross section of an energy-absorbing hollow-shaped body 10 which is slid over housing 5 and shows its supporting plate 6. Housing 5 is here provided with additional strips 41 of insulating material. A cushion 42 and cover 43 are merely suggested.

Figure 11:
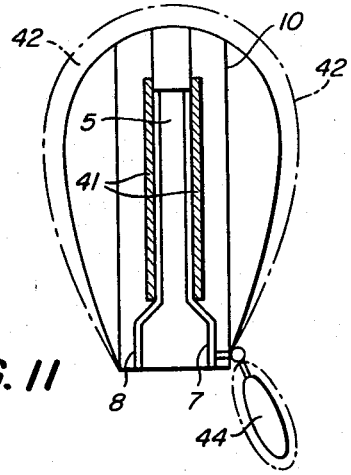
FIG. 11 shows the elements of FIG. 10 in lateral cross section.

FIG. 11 shows a lateral cross section of the same elements as FIG. 10 with an additional fixed or jointed flap 44 for dampening an impact directed against vertical adjustment brace 4.

That which is claimed is:

1. A head rest for attachment to the back of an automobile seat comprising a bar pivotable about an axis at one end to the back of said seat, an energy absorbing body, a housing in said energy absorbing body telescoped over the other end of said bar, tooth means positioned along the length of said bar and means carried by the housing interfitting with the tooth means for holding the housing in different telescoped positions of adjustment on said bar, said bar extending radially from the axis of pivoting and the adjusting movement of said housing being radial with respect to the axis of pivoting, the means carried by the housing comprising a block member located within the housing and having a plurality of teeth which are complemental to and interfit with said tooth means on said bar, the block member being located in an enlarged portion of the housing at its bottom end, a means being also carried by the housing at said enlarged portion for urging said bar and said block towards each other, and resilient means being provided between the bar and the housing at the upper end of the bar.

2. A head rest as claimed in claim 1 in which the means for urging said bar and said block towards each other comprises a cam.

3. A head rest as claimed in claim 1, in which the means for urging said bar and said block towards each other comprises a spring.

4. A head rest as claimed in claim 1 in which the energy absorbing body is supported for pivotal and radial adjustment about the axis of pivoting by a single bar, said bar having an integral bottom end portion cooperating with means for holding the bar in different angular positions of adjustment about said axis of pivoting.

5. A head rest as claimed in claim 4 in which the means for holding the bar in different angular positions comprises interlocking tooth means enclosed in housing means.

6. A head rest as claimed in claim 5 in which said interlocking tooth means extend longitudinally along frusto-conical surfaces, the axes of said surfaces being colinear with the axis of pivoting and the tooth means converging outwardly.

* * * * *